United States Patent [19]

Seiferling

[11] Patent Number: 4,573,124

[45] Date of Patent: Feb. 25, 1986

[54] HEIGHT CONTROL FOR AGRICULTURAL MACHINE

[75] Inventor: James E. Seiferling, Rio Vista, Calif.

[73] Assignee: Blackwelders, Rio Vista, Calif.

[21] Appl. No.: 569,207

[22] Filed: Jan. 9, 1984

[51] Int. Cl.[4] ............................................. A01D 75/28
[52] U.S. Cl. .................................... 364/424; 56/10.2; 56/DIG. 15
[58] Field of Search ....................... 364/424, 561, 562; 377/17, 24, 30; 56/10.2, DIG. 15

[56] References Cited

U.S. PATENT DOCUMENTS

| | | | |
|---|---|---|---|
| 4,136,508 | 1/1979 | Coleman et al. | 56/10.2 |
| 4,229,724 | 10/1980 | Marcus | 377/17 |
| 4,250,402 | 2/1981 | Mizote et al. | 377/24 |
| 4,300,638 | 11/1981 | Katayama et al. | 364/424 |
| 4,414,792 | 11/1983 | Bettencourt et al. | 56/10.2 |
| 4,437,295 | 3/1984 | Rock | 56/10.2 |
| 4,461,015 | 7/1984 | Kulhavy | 377/17 |
| 4,507,910 | 4/1985 | Thornley et al. | 56/10.2 |

Primary Examiner—Gary Chin

Attorney, Agent, or Firm—Owen, Wickersham & Erickson

[57] ABSTRACT

An agricultural machine having a machine element supported by and movable relatively to a wheel-supported main frame with power means for moving it up and down relatively in small incremental steps, to vary the distance to ground level. The distance to ground is determined and electrical signals corresponding to the distance generated. A control circuit receives the signals and provides "up" and "down" pulses. A monitor-controller circuit receives the "up" and "down" pulses and transmits them to the power means for actuating an incremental step up or down for each pulse. The monitor-controller determines whether a preselected member of consecutive "down" pulses occur without an "up" pulse between them and within a short predetermined time period and actuates circuit disabling and override means only when the preselected number of "down" pulses occur within the predetermined time period; if so, further "down" pulses are prevented from passing to the power means, and both "up" and "down" pulses are nullified for a set time period, during which the machine element is moved toward or to its initial position.

36 Claims, 4 Drawing Figures

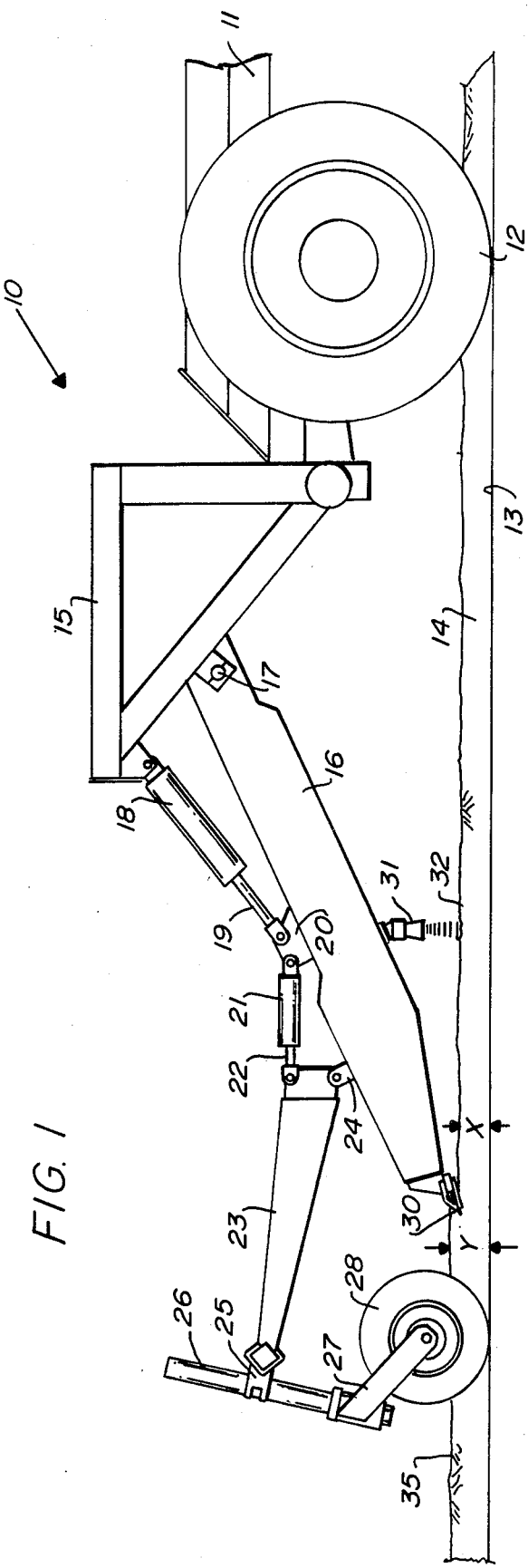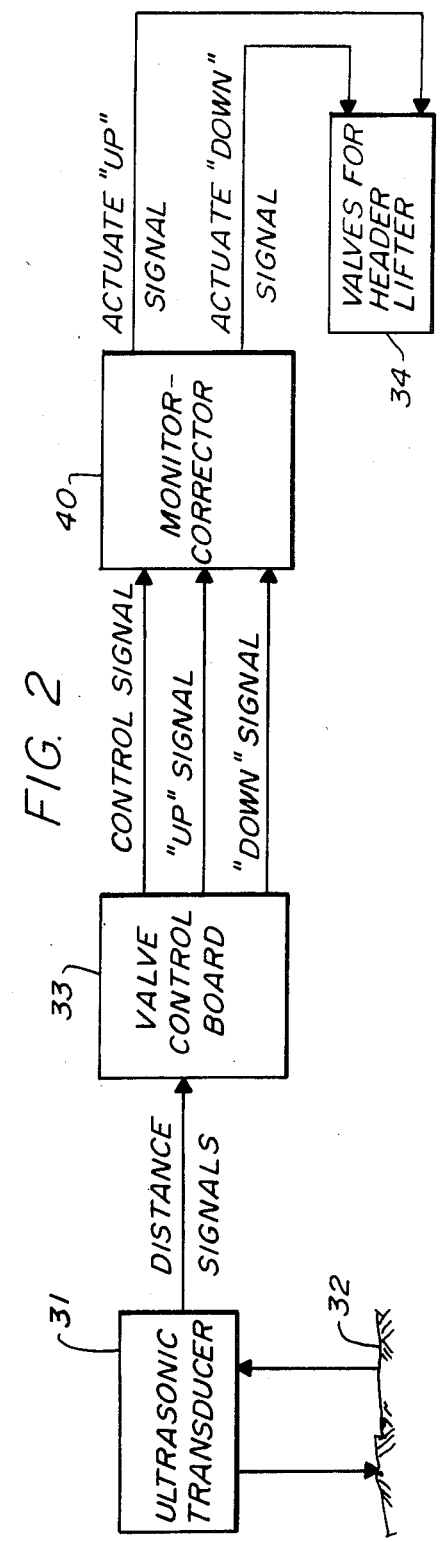

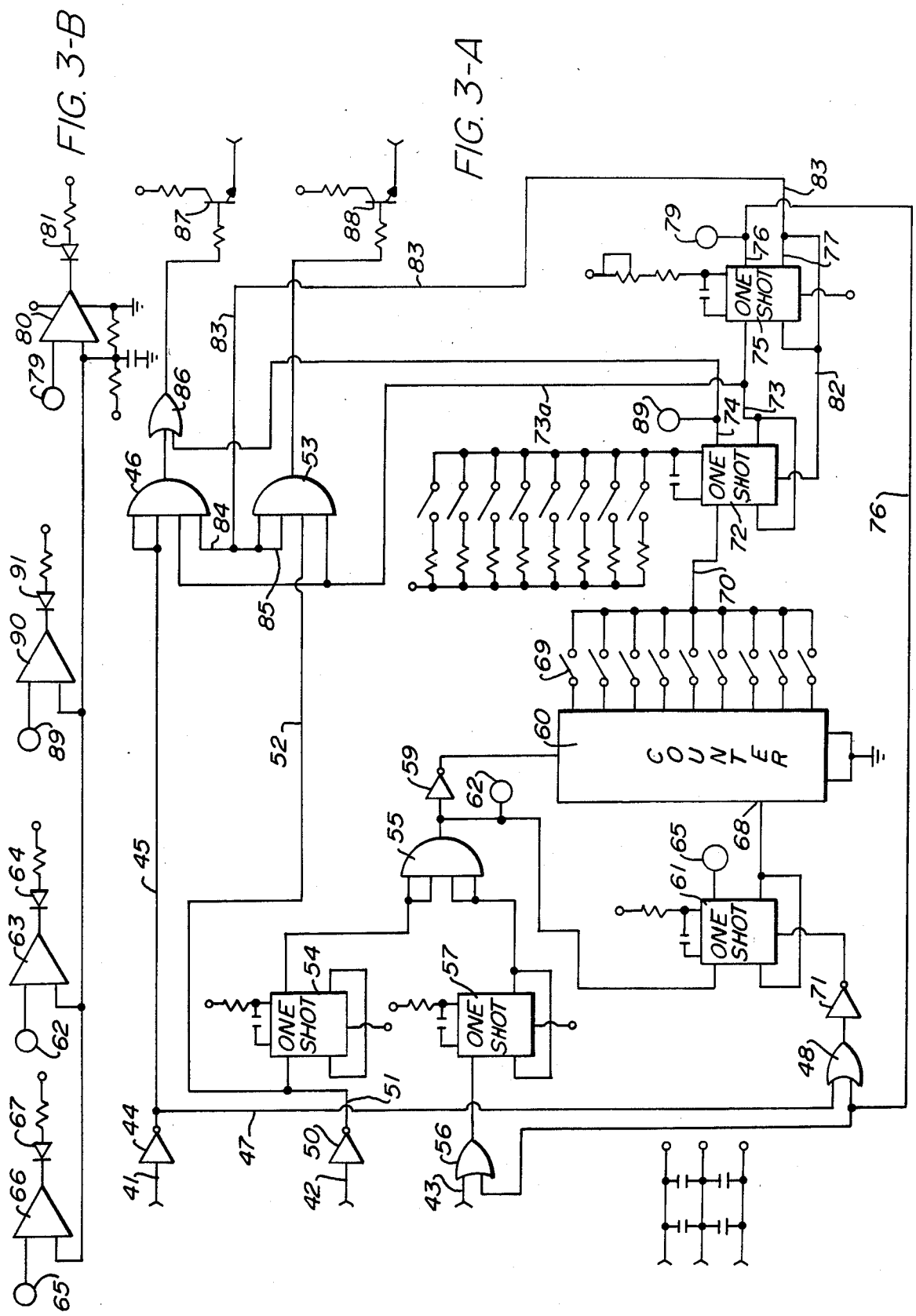

HEIGHT CONTROL FOR AGRICULTURAL MACHINE

This invention relates to an agricultural soil contacting machine having an automatic height or depth control apparatus. For example, the agricultural machine may be a tomato harvester having a header with an elevator and a cutting sickle blade, the header having a depth control device for determining the depth of the cut made by the sickle blade and the height of the lower end of the elevator relative to the soil below it. It also relates to the method employed and to the monitor-corrector circuit employed.

BACKGROUND OF THE INVENTION

This invention is an improvement of the invention described and claimed in application Ser. No. 363,642 filed Mar. 30, 1982, now U.S. Pat. No. 4,414,792, issued Nov. 15, 1983.

In that invention, a system is provided by which an ultrasonic transducer sends out an ultrasonic signal toward the ground bed level, and receives back a signal reflected from the ground, together with a reflected calibration signal of its own. From these two signals an electrical circuit determines the distance of the ultrasonic transducer from the ground or bed level. That signal is then subjected to certain corrections and calculations, and a signal is sent to a hydraulic device which controls the position of the front of the tomato harvester, including its sickle blade, in relation to the frame of that harvester.

The device operates very well, especially in fields that are substantially level, as agricultural fields go. However, in fields having knoll-like portions, some problems have developed, and the present invention is intended to solve these problems.

The circuit actuated by the ultrasonic transducer acts on the basis (1) that there is a substantially constant distance from the surface of the bed in front of the sickle blade to the bottom of the furrow in which the wheels of the harvester are riding and (2) that the ratio of that distance to the top of the bed *after* the sickle blade has passed is also substantially constant.

When the harvester comes to a sudden rise in bed level, the sickle blade is further below the level of the bed in front of it than would ordinarily be the case; therefore the supposedly constant ratio is changed significantly. As a result, dirt is sent up into the harvester in increased amounts. Under such circumstances the ultrasonic transducer, which determines the distance from itself to the top of that portion of the bed lying to the rear of the sickle blade, finds that this distance has increased and sends a signal indicating this increase in distance. The control circuit assumes from that signal that the front end of the header and its blade are higher than is desired, and orders them to go lower. Since they were already too low with respect to the bed ahead of the sickle and now go still lower, the critical ratio increases further, and the increased distances measured by the ultrasonic transducer result in the control circuit sending the header and sickle blade still lower. This phenomenon can happen very quickly, and within a few seconds the harvester blade can then dive to a depth where the harvester has to be stopped completely, until the situation is corrected. In some circumstances, this diving can even damage the machine itself.

Accordingly it is an object of the present invention to provide a depth control device for agricultural machines, including tomato harvesters and the like, in which these anomalous situations are accommodated and the machine (e.g., the header and its sickle blade) is prevented from diving or going too low.

SUMMARY OF THE INVENTION

According to the invention an agricultural machine with a wheel-supported main frame has a machine element movable relatively to the main frame, and having an initial position. Power means on the frame moves the element up and down relatively to the main frame in small incremental steps, to vary the distance between a portion of the element and ground level. Distance-determining means mounted on the element determines the distance between itself and ground level and sends electrical signals corresponding to such distance to a control circuit that receives the signals and provides "up" pulses and "down" pulses according to whether the distance is decreasing or increasing.

A monitor-corrector circuit is connected to the control circuit and receives the "up" and "down" pulses and normally transmits them to the power means for actuating an incremental step up or down of the machine element for each pulse. Counting means in the monitor-corrector circuit determines whether a preselected number of consecutive "down" pulses occur without an "up" pulse between them and within a short predetermined time period. Finally, circuit disabling and override means are connected to the counting means and are actuated only when the preselected number of "down" pulses occur within the predetermined time period. Then they block further "down" pulses from passing to the power means, block out additional "up" and "down" pulses for a set time period, and return the machine element to its initial position, resetting the counting means to zero.

Thus, the invention provides a monitor-corrector for a height control device for an agricultural machine element, wherein the machine element is actuated by "up" signals and "down" signals from a control circuit to pass or nullify signals from the control circuit to a power device that moves the machine element up and down, respectively, through "up" and "down" actuators. The machine element may be a header, one type of such header being used in tomato harvesters to sever the tomato vines and then pick them up and elevate them.

The monitor-corrector has its counter preset for a predetermined number of activating pulses by manually closing one of a series of count-controlling switches. The counter has a pulse input, a pulse output, and a reset; it also has output actuating means for actuating the pulse output only when the predetermined number of actuating pulses has been applied to the pulse input before the reset is actuated. Time delay means actuates the counter reset after a short predetermined time interval.

"Down" applying means apply each "down" signal to the pulse input, to the time delay means to initiate the time interval, and also to a "down" actuator AND gate normally in a ready state and connected to a "down" actuator switch therebeyond.

"Up" applying means apply each "up" signal to the counter reset to actuate it and also to an "up" actuator AND gate, normally in a ready state and connected to a "down" actuator switch therebeyond.

First and second one-shot multivibrators are connected in series to the output from the counter; there is a time delay in the second one-shot. Override means connects the output of the first one-shot multivibrator to the "up" actuator switch, while disabling means connects the output of the second one-shot multivibrator to both AND gates, to disable further actuation of both the "up" actuator AND gate and the "down" actuator AND gate for a predetermined time interval. The output means of the second one-shot multivibrator is also connected to the counter reset.

As a result, a series of "down" signals to the machine element or header taking place in a short time interval, as determined by the time-delay means, is detected by the counter and results in disabling the transmission of both "up" and "down" signals to the power device that moves the machine element or header and also results in returning the machine element to its initial position by overriding the "up" actuator switch.

BRIEF DESCRIPTION OF THE DRAWINGS

FIG. 1 is a fragmentary view in side elevation of a front portion of a tomato harvester or the like having a depth control apparatus.

FIG. 2 is a block diagram of the circuitry and functional operation by which the depth-determining ultrasonic transducer causes the sickle blade to go up and down relative to the harvester frame.

FIG. 3A is a circuit diagram of a monitor-corrector circuit embodying the principles of the invention.

FIG. 3B is a circuit portion of the monitor-corrector circuit which would be difficult to show within FIG. 3A, where connection points are indicated.

DESCRIPTION OF A PREFERRED EMBODIMENT

FIG. 1 shows the front portion of a suitable agricultural machine, such as a tomato harvester 10, omitting the rear portions thereof.

The harvester 10 has a main frame 11 partially supported on front wheels 12, the left front wheel 12 being shown. There are also rear wheels, but they are not shown in this view. These wheels 12 ride in furrows 13 on each side of a bed 14. The bottom surface of each furrow 13 is necessarily lower than the upper surface of the bed 14.

Forward of the wheels 12 is a subframe 15 supported by the harvester main frame 11, to which a header 16 is attached by means of a pivot shaft 17 and hydraulic apparatus, including a cylinder 18 and piston apparatus having a connecting rod 19. The cylinder 18 is pivotally connected to the subframe 15, and the piston rod 19 is pivotally connected to a bracket 20 on the header 16. Another hydraulic apparatus has its cylinder 21 connected pivotally to the bracket 20 and its piston rod 22 pivotally connected to a gauge frame 23. The gauge frame 23 is pivotally connected to another bracket 24 on the header 16. The forward end of the gauge frame 23 has a supporting socket 25 that holds, in any desired adjustable vertical position, a substantially vertical rod 26, at the lower end of which is a yoke 27 supporting a gauge wheel 28. There are gauge wheels 28 on both sides of the header 16 and they ride in the furrows 13.

As in U.S. patent application Ser. No. 363,642, filed Mar. 30, 1982, now U.S. Pat. No. 4,414,792 issued Nov. 15, 1983, the hydraulic cylinders 18 and 21 and their pistons act to govern the height relative to the ground of the front end of the header 16 and its sickle blade assembly 30. Attached to the underside of the header 16 rearwardly from the sickle blade assembly 30, is an ultrasonic transducer assembly 31 which sends out ultrasonic waves directed toward the upper surface 32 of the bed 14 lying to the rear of the sickle blade and also toward a calibrating bar forming part of the transducer assembly 31. The assembly 31 then receives the reflections of those waves back from the bed surface 32 and from the calibrating bar, so that it can determine the distance from the transducer assembly 31 to the bed surface 32.

As shown in FIG. 2, this ultrasonic transducer 31 then sends its distance signals to a control board 33 located on the harvester 10, which controls hydraulic valves 34. In the present invention this control is exercised through a monitor-corrector 40, but in the prior art, there was no monitor controller and the valve control board 33 sent an "actuate down" signal or an "actuate up" signal directly to the valves 34 for the header lifter, in accordance with an increase or decrease in distance between the ultrasonic transducer 31 and the bed level 32. The valves 34 then sent hydraulic fluid to the hydraulic cylinder 21 to adjust the height of the front edge of the header 16 and the sickle blade 30 so as to keep the sickle blade 30 working at a preset depth so long as the ground level varied within normal limits.

The distance from the undisturbed top surface 35 of the bed which is in front of the sickle assembly to the bottom of the furrow 13 is in the distance Y, as shown in FIG. 1. Some dirt will be lifted up onto the elevating portion of the header 16, along with the fruit to be processed. To the rear of the sickle assembly 30, the upper surface 32 of the bed 14 is therefore lowered, and the distance X from the bed surface 32 to the bottom of the furrow 13 is decreased. Normally the relationship between X and Y is kept substantially constant, and the movement up and down of the sickle 30 is adapted to do that. Thus, so long as the relationship between X and Y remains substantially constant, the automatic header height control system is stable.

Now, assume that the bed level varies beyond its normal limits. When substantially more dirt is forced into the header 16 or is pushed into the furrow 13, the ultrasonic transducer 31 finds that the distance between itself and the surface 32 has increased; therefore, in the prior art the control board 33 then directed the valves 34 to cause the sickle 30 to seek a lower level. Since the sickle 30 was already further below the ground than was intended, in other words, since the distance Y was significantly greater than what was allowed for, the lowering of the sickle 30 further into the ground resulted in putting still more dirt into the header's elevator and into the harvesting system, and also resulted in a further lowering of the surface 32 so that the transducer 31 would again direct the blade 30 to move lower and would continue to do this in an unending cycle that soon produced diving. The operator, once he saw this going on, could stop the harvester 10 and take over manually, but by that time it might be too late, for damage might have been done.

In the present invention, the valve control board 33 sends each of its "up" signals and "down" signals first to a monitor corrector 40, which is the new element in the present invention, and the monitor corrector 40 in return sends control signals to the valves 34 for the header lifter.

Referring now to FIG. 3A, the valve control board 33 is connected to the monitor-corrector 40 by three lines 41, 42, and 43, indicating, respectively, the occurrence of an upstep signal, a downstep signal, and whether the harvester 10 is set for manual control or for automatic control by the transducer 31 and its related circuits. The signals are in the form of pulses which fall and then rise; that is, go from a particular voltage value to zero voltage and then back up to the particular voltage value. Each upstep pulse goes via the line 41 to an inverter 44 and is thereafter split into two paths; one line 45 goes to an AND gate 46, while another line 47 goes to an OR gate 48.

Each downpulse goes via the line 42 to an inverter 50 and from there via lines 51 and 52 to an AND gate 53, and also from the line 51 to a one-shot multivibrator 54 and from there to an AND gate 55.

When the automatic control is turned on, it sends a pulse via the line 43 to an OR gate 56, the output of which is delivered to a one-shot multivibrator 57. The multivibrator 57 imposes a delay of about ten seconds and then releases its output to the AND gate 55. The purpose of the ten second delay is to enable the header sickle 30 to move quickly to the depth selected at the beginning of operations. After that, there is no further delay, so long as the automatic mode remains "on".

After the delay then, the AND gate 55 is activated by the outputs of the two one-shots 54 and 57 to produce a perfect pulse shape. The AND gate 55 sends its output along two paths, one going to an inverter 59 and from there to a counter 60. The other path leads to a one-shot multivibrator 61 which imposes a two second delay; it also leads to a branch output 62 discussed below.

The purpose of the inverter 59 is to delay the pulse counting by causing the counter 60 to trigger on the *trailing* edge of the pulse rather than on the *leading* edge. This, in turn assures that the counter 60 will be reset to zero *before* the first subsequent count pulse occurs.

The branch output 62 is connected, as shown in FIG. 3B, to an amplifier 63 and from there to a light-emitting diode 64 on an instrument control board adjacent the operator's seat, which lights each time a downstep takes place. Similarly, an output from the multivibrator 61 goes by a line 65 to an amplifier 66 which also actuates a light emitting diode 67 indicating in this instance, that the gate from the multivibrator 61 is then open. After the two second delay imposed by the one-shot multivibrator 61, it sends an output signal to the reset 68 for the counter 60 and the diode 67 goes off.

The counter 60, as shown, may be provided with a number of outputs, each with an individual switch 69, only one of which is closed at any one time, so that the operator can control activation on the basis of any number of counted pulses, e.g., any number between one and nine, as shown by closing one particular switch. The closed switch 69 defines how many pulses must take place during the two second delay period (set by the one-shot 61) in order for the counter 60 to send an output signal, since at the end of two seconds after the first such pulse, the counter 60 is reset to zero and starts again. Thus, each delivery of a pulse through the inverter 59 to the counter 60 will be counted, and if more pulses than the critical number determined by which the switch 69 is closed—say three or four pulses—take place during the two-second interval; then and only then there will be an output from the counter 60 to a line 70. If that critical number is not reached within the two-second period, then at the end of two seconds, the counter 60 will be reset to zero.

Also, each output pulse from an upstep, which passes along the line 47 and through the OR gate 48, goes to an inverter 71 and will result in causing a reset immediately, without regard to the two second delay. Thus, if a downstep is followed by an upstep before there is another downstep, the counter 60 will be reset to zero, so that even if there are more downsteps within two seconds of the first one, there will not be any output through the line 70 based on the first downstep pulse. Such an upstep pulse also resets the one-shot multivibrator 61, as can be seen from FIG. 3A.

If there is any output from the counter 60 delivered to the line 70, it goes next to a trigger input of a one-shot multivibrator 72 which delivers output to two lines 73 and 74 after a settable delay of about 45 to 360 milliseconds. The line 73 goes to another one-shot multivibrator 75 having a settable delay, such as from ½ second to 5½ seconds and having two output lines 76 and 77.

The output line 74 from the one-shot multivibrator 72 goes to the OR gate 86, and enables the switch 87, sending one upward pulse to the header 16 to move it up one step. (The switches 87 and 88 must be actuated in order for the monitor corrector 40 to actuate the up and down valves 34.)

Also, the pulse along the line 74 actuates an "up" override circuit via a line 89 having an amplifier 90 and an LED 91, which lights on the board to tell the operator that the "up" override circuit has been actuated.

The line 73 carries the inverted output from the first one-shot multivibrator 72. Normally, its voltage is high, but actuation of the multivibrator 72 sends the voltage low for a time. Thus, normally its branch line 73a is high at the AND gates 46 and 53, but actuation of the multivibrator 72 depresses that voltage and bars the AND gates 46 and 53 to all pulses from the lines 45 and 52 until the multivibrator 72 is reset.

Similarly, the line 76 sends out a positive pulse while the line 77 inverts and provides a low when formerly there was a high.

After the set time delay at the multivibrator 75, the line 76 signals the OR gate 48 and immediately causes a resetting of the counter 60. The line 76 also goes to the OR gate 56 to start a new ten-second delay period, so that the header 16 can move rapidly back to its initial height without re-tripping the monitor-corrector 40. Output from the multivibrator 75 is a disabling pulse, and it also goes from the line 76 by a line 79 to an amplifier 80 in FIG. 3B and from there to a light emitting diode 81, indicating "disabled" on the operator's control board.

The output line 77 from the second one-shot multivibrator 75 goes via a line 82 to re-reset the one-shot 72 and sends a disabling pulse via lines 83 and 84 to the "up" AND gate and, via the lines 83 and 85 to the "down" AND gate 53. These pulses function to place a logic low on the AND gates 46 and 53 and disable all further "up" and "down" signals by preventing actuation of transistor switches 87 and 88 when the next "up" or "down" pulse comes to its AND gate 46 or 53.

To summarize, the purpose of the monitor-corrector 40 is to detect when the header 76 is moving down too fast. This is caused by too much dirt being removed from the bed. When this happens, a runaway situation tends to develop and to continue until the header sickle 30 reaches the bottom of the bed 14. This can cause great damage to the harvester.

It was noticed during normal operation that the up-/down valves 34 generally move no more than two or three steps in any one direction and that the rate was usually one step per second. Hence, the monitor-corrector circuit 40 has a two second gate 61, a pulse counter 60 and an override circuit. The basic theory is if there are more downward pulses than a preselected number of pulses during a two-second period, the monitor-corrector 40 will detect that fact and block any further downward pulses and will also apply a pulse of sufficient length to push the header 16 back up to where it started before the circuit 40 was tripped. It also locks out both the "up" and "down" valves 34 for a short period of time following the upward correction, enabling the bed 14 to stabilize. The circuit 40 is therefore a bed-slope monitor and if it detects a slope that is too steep, then it assumes that too much dirt is being removed from the bed 14 and makes an upward correction.

The circuit also has one more added benefit. If there is a failure in the circuit of the valve control board 33, it usually drives the "down" valve to a maximum down rate. The circuit 40 also detects this and does not allow the sickle 30 to move down more than a selected distance corresponding to the preselected number of downsteps actuating the output 70, e.g., ¼ inch, under these conditions. Under these conditions, it also pushes the header 16 back up, preventing damage to the harvester. If the failure signal persists, the worst that can happen is that the header 16 will oscillate, but doing so less than the ¼ inch range preselected. The operator should notice this and turn the automatic header control off until it can be serviced.

Summarizing the monitor corrector circuit 40, both the "up" and "down" steps from the valve control board 33 are routed through the circuit 40. They are both inverted by the respective inverters 44 and 50. The "down" steps are split two ways, going to the AND gate 53 and to the one-shot multivibrator 54, while the "up" steps go to the AND gate 46 and to the OR gate 48. The monitor 40 is deactivated for ten seconds following the pushing of the automatic button for the header height control. This is done to allow the sickle blade 30 to move quickly to the selected depth. The OR gate 56 feeds the tripper input of the one-shot 57, and its output goes low for ten seconds, during which no down pulses are passed to the pulse counter 60. The first downpulse, after the ten-second delay triggers the one-shot 61, which has a time period of two seconds, and enables the counter 60, which begins counting the down pulses. The inverter 59 causes the counter 60 to trigger on the trailing edge of the pulse rather than the leading edge, so that the counter 60 will be re-set to zero before the first count pulse occurs. If an "up" pulse occurs after a "down" pulse and before the two-second count is completed, the output of the one-shot 61 is immediately terminated, and the counter 60 is re-set to zero. The output of the one-shot 61 is also terminated upon the completion of the lockout cycle. At the end of two seconds the counter 60 is re-set to zero by the one-shot 61 going to a logic high state.

The nine outputs of the counter 60 are switch selectable. If less than the number of pulses selected by closing a particular switch 69 is counted during the two-second period, nothing happens and the counter 60 is re-set. If the set count is reached, the output pulse from the counter drives the two one-shots 72 and 75, which are in series. The first one-shot 72 produces an "up" pulse, which has a selectable time. This feeds the "up" valve driver through the OR gate 86. The first one-shot also stops any more "up" and "down" steps by not allowing them to pass the AND gates 46 and 53. When this sequence is completed, the second one-shot 75 is triggered, and it locks out both the "up" and "down" pulses for about one to two seconds by putting a logic low at both of the AND gates 46 and 53. This allows the bed to stabilize. The second one-shot 75 also triggers the one-shot 57. After this occurs, normal operation returns. The light emitting diodes 91, 81, 64, and 67 indicate, respectively, the "up" override, the up/down lockout, the two-second gate, and the down pulses to the counter.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An agricultural machine including in combination:
   a wheel-supported main frame,
   a machine element movable relatively to said main frame, and having an initial position,
   power means on said frame for moving said element up and down relatively to said main frame in small incremental steps, to vary the distance between a portion of said element and ground level,
   distance-determining means mounted on said element for determining the distance between itself and ground level and for generating electrical signals corresponding to such distance,
   a control circuit supported by said frame, receiving said signals and providing "up" pulses and "down" pulses according to whether said distance is decreasing or increasing,
   a monitor-corrector circuit supported by said frame, connected to said control circuit and receiving said "up" and "down" pulses and transmitting them to said power means for actuating an incremental step up or down of said machine element for each said pulse,
   counting means in said monitor-corrector circuit for determining whether a preselected member of consecutive "down" pulses occur without an "up" pulse between them and within a short predetermined time period, thereby indicating a significant change in the slope of the ground level, and
   circuit disabling and override means connected to said counting means and enabled only when said preselected number of "down" pulses occur within said predetermined time period for blocking further "down" pulses from passing to said power means, blocking out additional "up" and "down" pulses for a set time period, and returning said machine element toward its said initial position.

2. The machine of claim 1 having
   means in said control circuit for switching between manual operation of said power device to automatic operation employing said monitor-corrector, and
   time-delay means for delaying transmission of said pulses to said counter until expiration of a set period following switching to automatic operation.

3. The machine of claim 1 having warning means for indicating the actuation of said circuit disabling and override means.

4. The machine of claim 1 wherein said counting means includes setting means for setting said preselected number of pulses.

5. An agricultural machine including in combination:
a wheel-supported main frame,
a machine element movable relatively to said main frame, and having an initial position,
power means on said frame for moving said element up and down relatively to said main frame in small incremental steps, to vary the distance between a portion of said element and ground level,
distance-determining means mounted on said element for determining the distance between itself and ground level and for generating electrical signals corresponding to such distance,
a control circuit supported by said frame, receiving said signals and providing "up" pulses and "down" pulses according to whether said distance is decreasing or increasing, said control circuit including
a monitor-corrector having a counter preset for a predetermined number of enabling "down" pulses and having a pulse input for said "down" pulses, a pulse output, a reset, and output enabling means for enabling said pulse output only when said predetermined number of enabling "down" pulses is applied to said pulse input before the reset is actuated,
time delay means for actuating said counter reset after a short predetermined time interval,
a "down" actuator AND gate connected to said control circuit and normally enabled to pass a "down" pulse,
a "down" actuator switch actuated by said "down" actuator AND gate,
"down" applying means for applying each "down" pulse to said "down" actuator AND gate, to said pulse input, and to said time delay means to initiate said predetermined time interval,
an "up" actuator AND gate connected to said control circuit, normally enabled to pass an "up" pulse,
an "up" actuator switch connected to the output from said "up" actuator AND gate,
"up" applying means for applying each "up" pulse to said counter reset to enable said counter,
first and second one-shot multivibrators connected in series to the output from said counter and including a time delay in said second one-shot multivibrator, each said multivibrator having output means,
override means connected to the output means of said first one-shot multivibrator and to said "up" actuator switch for sending an "up" pulse to said power means upon actuation of said first multivibrator, and
disabling means connected to said output means of said second one-shot multivibrator and to both said AND gates to disable further actuation of both said "up" actuator AND gate and said "down" actuator AND gate for a predetermined time interval.

6. The machine of claim 5 wherein said output means of said second one-shot multivibrator is also connected to said counter reset.

7. The machine of claim 5 having a third one-shot multivibrator connected to said control circuit for receiving each "down" pulse and having an output connected to said pulse input of said counter for precisely shaping each said pulse.

8. The machine of claim 7 having inverter means connected between the output of said third one-shot multivibrator and said pulse input of said counter, for assuring that said counter is responsive to only the trailing edge of each said "down" pulse.

9. The machine of claim 5 wherein said time delay means comprises a third one-shot multivibrator having an input connected to said control circuit for receiving enabling "down" pulses, said third one-shot multivibrator having an output connected to said counter reset for enabling said counter reset only after a predetermined time following reception of a said "down" pulse at the input of said third multivibrator.

10. The machine of claim 9 wherein said third multivibrator is associated with first and second warning means, said first warning means being actuated by each "down" pulse delivered to the input of said third multivibrator, said second warning means being actuated by output from said third multivibrator at the expiration of said predetermined time during which said counter reset is enabled.

11. The machine of claim 5 having
means in said control circuit for switching between manual operation of said power device and automatic operation employing said monitor-corrector, and
additional time-delay means for delaying transmission of said pulses to said counter until expiration of a set period following switching to automatic operation.

12. The machine of claim 11 wherein the output means of said second one-shot multivibrator is connected to said additional time-delay means.

13. The machine of claim 11 wherein said additional time delay means comprises
a third one-shot multivibrator connected to said control circuit for reception of a signal therefrom upon initiation of automatic operation and
a third AND gate having a first, enabling input connected to the output from said third one-shot multivibrator, a second actuating input connected to said control circuit to receive each of said "down" pulses in sequence and an output connected to the pulse input of said counter and passing each "down" pulse only when said first, enabling input is enabled.

14. The machine of claim 13 having warning means connected to said output from said third AND gate.

15. The machine of claim 5 having warning means connected to the output means of said second one-shot multivibrator.

16. The machine of claim 5 wherein said first one-shot multivibrator has a reset switch connected to the output means of said second one-shot multivibrator.

17. The machine of claim 5 wherein said pulse output of said counter is connected in parallel to each of a series of output switches each connected to said first one-shot multivibrator, all but one being open at any one time, each one of these switches being actuated only upon a different predetermined number of consecutive "down" pulses being delivered thereto during the predetermined time period, that one which is closed determining how many consecutive "down" pulses are needed during the predetermined time period to transmit the output from said counter to said first multivibrator.

18. A monitor-corrector for a height-control device for a tomato harvester header that is actuated by "up" pulses and "down" pulses from a control circuit, said monitor-corrector acting to pass or block pulses from the control circuit to a pulse-actuated power device that moves the forward end of said header in incremental steps up and down, respectively, through "up" and "down" actuators, including in combination, a counter preset for a predetermined number of enabling "down" pulses from said control circuit and having a pulse input for said "down" pulses, a pulse output, a reset, and output enabling means for enabling said pulse output only when said predetermined number of enabling "down" pulses is applied to said pulse input before the reset is actuated, time delay means for actuating said counter reset after a short predetermined time interval, a "down" actuator AND gate for connection to said control circuit and normally enabled to pass a "down" pulse, a "down" actuator switch actuated by said "down" actuator AND gate, "down" applying means for applying each "down" signal to said "down" actuator AND gate, to said pulse input, and to said time delay means to initiate said predetermined time interval, an "up" actuator AND gate for connection to said control circuit and, normally enabled to pass an up pulse, an "up" actuator switch connected to the output from said "up" actuator AND gate, "up" applying means for applying each "up" signal to said counter reset to enable said counter, first and second one-shot multivibrators connected in series to the output from said counter and including a time delay in said second one-shot multivibrator, each said multivibrator having output means, override means connected to the output means of said first one-shot multivibrator and to said "up" actuator switch for sending an "up" pulse to said power means upon actuation of said first one-shot multivibrator, and disabling means connected to said output means of said second one-shot multivibrator and to both said AND gates to disable further actuation of both said "up" actuator AND gate and said "down" actuator AND gate for a predetermined time interval.

19. A monitor-corrector for a height control device for an agricultural machine element, actuated by "up" signals and "down" signals from a control circuit to pass or block signals from the control circuit to a power device that moves said machine element up and down, respectively, relative to a ground surface, through "up" and "down" actuators, including in combination, counting means for determining whether a preselected member of consecutive "down" pulses occur without an "up" pulse between them and within a short predetermined time period, thereby indicating a significant change in the slope of the ground surface, and circuit disabling and override means connected to said counting means and enabled only when said preselected number of "down" pulses occur within said predetermined time period for blocking further "down" pulses from passing to said power means, blocking out additional "up" and "down" pulses for a set time period, returning said machine element toward its said initial position, and resetting said counting means to zero.

20. The machine of claim 19 having means in said control circuit for switching between manual operation of said power device to automatic operation and time-delay means for delaying transmission of said pulses to said counting means until expiration of a set period following switching to automatic operation.

21. The machine of claim 19 having warning means for indicating the actuation of said circuit disabling and override means.

22. The machine of claim 1 wherein said counting means includes setting means for setting said preselected number of pulses.

23. A monitor-corrector for a height control device for an agricultural machine element, actuated by "up" signals and "down" signals from a control circuit to pass or block signal pulses from the control circuit to a power device that moves said machine element up and down, respectively, through "up" and "down" actuators, including in combination, a counter for connection to said control circuit preset for a predetermined number of enabling "down" pulses and having a pulse input for said "down" pulses, a pulse output, a reset, and output enabling means for enabling said pulse output only when said predetermined number of enabling "down" pulses are applied to said pulse input before the reset is actuated, time delay means for enabling said counter reset after a short predetermined time interval, a "down" actuator AND gate for connection to said control circuit and normally enabled to pass a down pulse, a "down" actuator switch actuated by said "down" actuator AND gate, "down" applying means for applying each "down" signal to said "down" actuator AND gate, to said pulse input, and to said time delay means to initiate said predetermined time interval, an "up" actuator AND gate for connection to said control circuit, normally enabled to pass an "up" pulse, an "up" actuator switch connected to the output from said "up" actuator AND gate, "up" applying means for applying each "up" signal to said counter reset to enable said counter, first and second one-shot multivibrators connected in series to the output from said counter and including a time delay in said second one-shot multivibrator, each said multivibrator having output means, override means connected to the output means of said first one-shot multivibrator and to said "up" actuator switch for sending an "up" pulse to said power means upon actuation of said first multivibrator, and disabling means connected to said output means of said second one-shot multivibrator and to both said AND gates to disable further actuation of both said "up" actuator AND gate and said "down" actuator AND gate for a predetermined time interval.

24. The monitor-corrector of claim 23 wherein said output means of said second one-shot multivibrator is also connected to said counter reset.

25. The monitor-corrector of claim 23 having a third one-shot multivibrator for connection to said control circuit for receiving each "down" pulse and having an output connected to said pulse input of said counter for precisely shaping each said pulse.

26. The monitor-corrector of claim 25 having inverter means connected between the output of said third one-shot multivibrator and said pulse input of said counter, for assuring that said counter is responsive to only the trailing edge of each said "down" pulse.

27. The machine of claim 23 wherein said time delay means comprises a third one-shot multivibrator having an input for connection to said control circuit for receiving enabling down pulses, said third one-shot multivibrator having an output connected to said counter reset for enabling said counter only after a predetermined time following reception of a said "down" pulse at the input of said third multivibrator.

28. The machine of claim 27 wherein said third multivibrator is associated with first and second warning means, said first warning means being actuated by each "down" pulse delivered to the input of said third multivibrator, said second warning means being actuated by output from said third multivibrator at the expiration of said predetermined time which enables said counter reset.

29. The machine of claim 23 having
   means in said control circuit for switching between manual operation of said power device and automatic operation employing said monitor-corrector, and
   additional time-delay means for delaying transmission of said pulses said counter until expiration of a set period following switching to automatic operation.

30. The monitor-corrector of claim 29 wherein the output means of said second one-shot multivibrator is connected to said additional time-delay means.

31. The monitor-corrector of claim 29 wherein said additional time delay means comprises
   a third one-shot multivibrator for connection to said control circuit for reception of a signal therefrom upon initiation of automatic operation and
   a third AND gate having a first enabling input connected to the output from said third one-shot multivibrator, a second actuating input for connection to said control circuit to receive each of said "down" pulses in sequence and an output connected to the pulse input of said counter and passing each "down" pulse only when said first enabling input is enabled.

32. The monitor-corrector of claim 29 having warning means connected to said output from said third AND gate.

33. The monitor-corrector of claim 23 having warning means connected to the output means of said second one-shot multivibrator.

34. The monitor-corrector of claim 23 wherein said first one-shot multivibrator has a reset switch connected to the output means of said second one-shot multivibrator.

35. The monitor-corrector of claim 23 wherein said pulse output of said counter is connected in parallel to each of a series of output switches, each connected to said first one-shot multivibrator all but one being open at any one time, each one of these switches being actuated only upon a different predetermined number of consecutive "down" pulses being delivered thereto during the predetermined time period, that one which is closed determining how many consecutive "down" pulses are needed during the predetermined time period to transmit output from said counter to said first multivibrator.

36. A method for controlling the up-and-down movement of a machine element movable relatively to a wheel-supported main frame of an agricultural machine, through power means that move the element up and down relatively to said main frame in small incremental steps, to vary the distance between a portion of said element and ground level, comprising:
   determining the distance between said portion of said element and ground level,
   generating electrical signals corresponding to such distance,
   converting said signals into "up" pulses and "down" pulses according to whether the distance is decreasing or increasing,
   counting the "down" pulses to determine whether a preselected number of consecutive "down" pulses occur, without an "up" pulse between them, within a short predetermined time period thereby indicating a significant change in the slope of the ground level,
   transmitting the pulses, so long as the "down" pulses per said time period are fewer than said preselected number, to said power means for actuating an incremental step up or down of said machine element for each said pulse,
   when and only when said preselected number of "down" pulses occur within said predetermined time period, blocking the transmission of further "down" pulses from passing to said power means, blocking out the transmission of additional "up" and "down" pulses for a set time period, and returning said machine element toward its said initial position.

* * * * *